United States Patent [19]
Bartlett et al.

[11] Patent Number: 5,820,287
[45] Date of Patent: Oct. 13, 1998

[54] ARTICULATED CONDUIT JOINT

[76] Inventors: William H. C. Bartlett, 1750 Rogers Ave., San Jose, Calif. 95112; Donald J. Brockhage, 1137 Park Brook Ct., Milpitas, Calif. 95035

[21] Appl. No.: 803,729

[22] Filed: Feb. 21, 1997

[51] Int. Cl.⁶ ........................................... F16C 11/04
[52] U.S. Cl. .............................. 403/84; 403/91; 403/145; 248/292.12; 248/291.1
[58] Field of Search ................... 403/83, 84, 88, 403/65, 66, 91, 120, 145, 146, 359, 103, 110; 248/292.12, 291.1; 362/287, 418, 427; 192/70.11, 85 AA

[56] References Cited

U.S. PATENT DOCUMENTS

| | | |
|---|---|---|
| 2,395,178 | 2/1946 | Fiori ...................................... 362/427 X |
| 3,208,774 | 9/1965 | Odwazny . |
| 3,322,886 | 5/1967 | Warshawsky . |
| 3,446,323 | 5/1969 | Hilpert .................................. 192/70.11 |
| 3,482,669 | 12/1969 | Foster-Pegg ....................... 192/85 AA |
| 3,593,952 | 7/1971 | Smith . |
| 3,601,598 | 8/1971 | Horn .................................... 362/418 X |
| 4,303,149 | 12/1981 | Lech, Jr. . |
| 4,494,177 | 1/1985 | Matthews . |
| 4,543,007 | 9/1985 | Quiogue . |
| 4,679,679 | 7/1987 | Lech, Jr. et al. . |
| 4,685,823 | 8/1987 | Lopez . |
| 4,700,017 | 10/1987 | Morand . |
| 4,706,331 | 11/1987 | Compton . |
| 5,027,671 | 7/1991 | Erikson et al. . |
| 5,146,808 | 9/1992 | Hoshino . |
| 5,154,382 | 10/1992 | Hoshino ........................... 248/291.1 X |
| 5,362,293 | 11/1994 | Romanauskas . |
| 5,398,978 | 3/1995 | Gagnon . |

*Primary Examiner*—Harry C. Kim
*Attorney, Agent, or Firm*—Townsend and Townsend and Crew LLP

[57] ABSTRACT

An articulated conduit joint (8) includes first and second arms (10, 12), defining first and second passages (106), pivotally coupled by a main clutched joint (14) for movement of the arms about a joint pin (78) defining a first axis (20). The main clutched joint includes a generally open central portion (70) located between first and second end portions (72, 74). Clutch plates (82, 84) in the first end portion are alternately keyed to the first end portion and the joint pin. A compression spring (100) within the second end portion biases the joint pin along the first axis and forces the clutch plates against one another. The first and second end portions are integral with the first and second arms so that relative pivotal movement of the arms about the first axis is frictionally resisted by the clutch plates sliding against one another. One or both of the arms may include a hollow arm extension (22) housed within an arm body (16) for movement about a second axis (24) passing along the passage within the arm. Clutch plates (32, 34) are keyed to the arm extension and the arm body in an alternating fashion and are biased against one another to provide frictional resistance to rotation of the arm extension within the arm body.

22 Claims, 6 Drawing Sheets

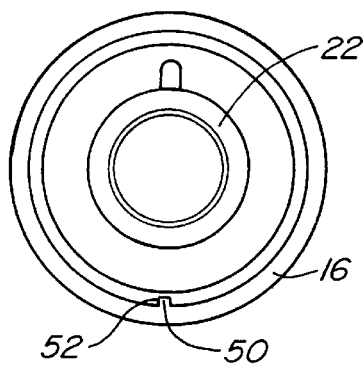
FIG. 6.
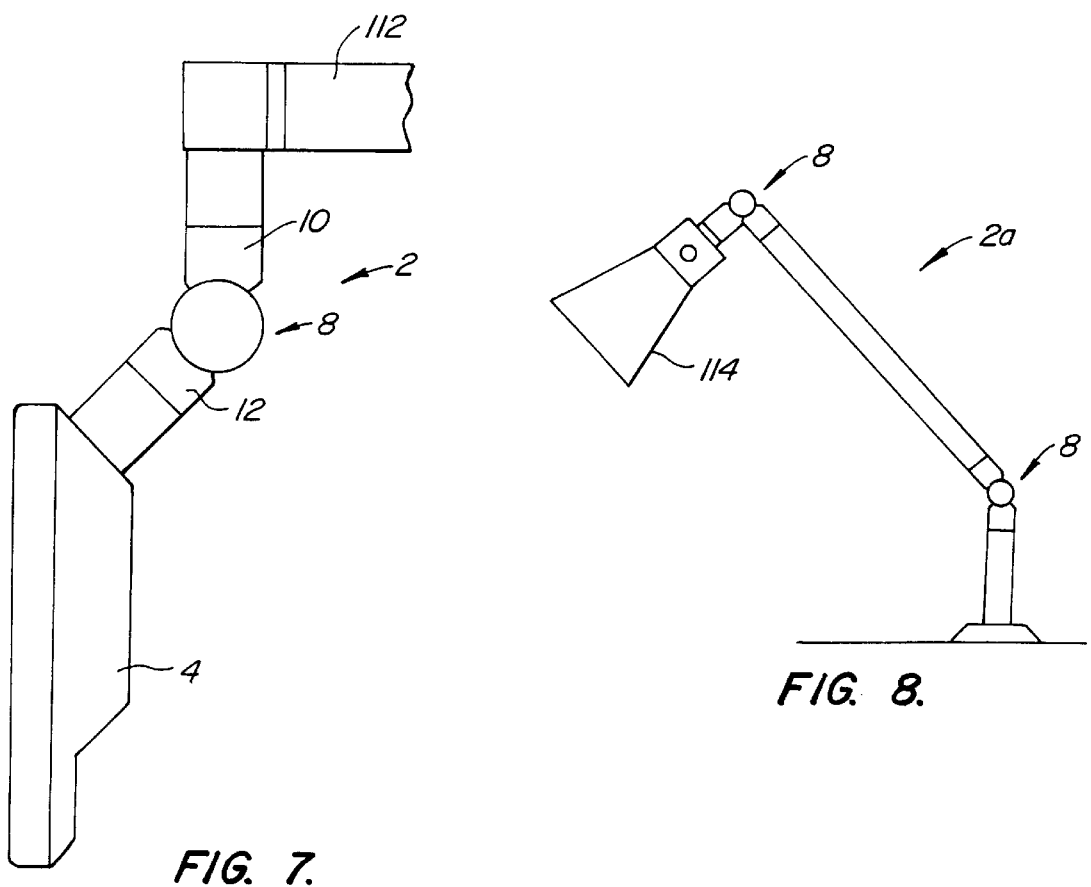
FIG. 7.
FIG. 8.

5,820,287

ARTICULATED CONDUIT JOINT

BACKGROUND OF THE INVENTION

Articulated conduit support arms are typically used to provide articulated support of various electrically-powered devices such as computer monitors, lamps, and illuminated magnifying lenses. Articulated conduit support arms are designed to be able to be moved and repositioned while supporting the weight of the device. The articulated conduit support arms also provide for the protection and concealment of electric cables and power lines connected to the device being supported.

Articulated support arms presently in use often require that a screw handle or wing nut be used to loosen and tighten joints for repositioning the device being supported. This is especially true when the device is relatively heavy, such as a flat-screened computer monitor. Some articulated support arms use pre-loaded clutches at the joints; these, however, are not aesthetically pleasing as they expose the clutch plates, springs, washers, and nuts, that constitute the clutch assembly, to view. Another problem with some conventional clutched joints is that they create the need to route power cords or cables around the open clutch assembly. This creates additional possibilities for damage to the cable or cord and further detracts from the aesthetic appeal of the assembly.

Ball-type joints are capable of a limited degree of universal movement when a cable or line is concealed within the joint. However, this type of joint usually requires a wing nut or hand screw type of tightener. Since the ball joint relies on its surface area for friction, the weight of many of the loads to be supported by a ball-type joint would require a large ball. Besides disturbing the aesthetic aspect, such large ball joints allow no provision for fine tuning of the amount of friction needed without external wing nuts or hand screws. Therefore, the most practical use of a ball joint is not when it is used as an offset joint but when a segment of a large spherical surface sits directly under the load, which is a common way many CRT computer monitors are presently supported.

SUMMARY OF THE INVENTION

The present invention is directed to a joint for an articulated conduit that provides multiple degrees of freedom of movement and adjustable friction preload in a compact configuration while permitting wires and cables to be easily routed through the joint.

The joint includes first and second arms, defining first and second passages, pivotally coupled by a main clutched joint for movement of the first and second arms about a first axis. The main clutched joint includes a generally open central portion located between first and second end portions, the three portions aligned along the first axis. A joint pin passes from the first end portion, through the central portion and to the second end portion. Clutch plates are housed within the first end portion with alternate clutch plates keyed to the first end portion and to the joint pin. A biasing element, typically a compression spring, is within the second end portion and biases the joint pin along the first axis so to bias the clutch plates against one another. The first and second end portions are integral extensions of the first and second arms and rotate with the first and second arms; therefore, pivotal movement of the first and second arms about the first axis is frictionally resisted by the clutch plates sliding against one another.

In one embodiment one of the arms includes an arm body and an arm extension housed within the arm body for movement about a second axis passing along the passage within the arm. Clutch plates are keyed to the arm extension and to the arm body in an alternating fashion and are biased against one another to provide frictional resistance to movement of the arm extension within the arm body and about the second axis. The rotary movement of the arm extension relative to the arm body about the second axis can be limited by the use of one or more rotary stops.

In one embodiment the central portion of the main clutched joint is created by cylindrical extensions of the first and second end portions. These cylindrical extensions preferably have opposed annular edges separated by a separator ring which provides for smooth frictional engagement between the opposed edges and helps maintain the opposed annular edges in position opposite one another.

One of the primary advantages of the invention results from the recognition that placing the stack of clutch plates on one side of the joint and the preloaded spring on the other side of the joint, leaves the central portion free for the wires or other flexible elements and permits the joint to be reasonably sized and aesthetically pleasing, typically by covering each end of the joint with an end cap. The amount of friction available with the invention can be adjusted quite easily by merely increasing or decreasing the number of clutch plates, changing the frictional characteristics of the clutch plates, adjusting the size of the spring, or changing how tightly the spring is compressed.

Another advantage of the invention arises from use of identical housing assemblies to create the first and second arms and the main clutch joint. The invention is designed so that one or both of the arms can pivot about its own axis or be locked in place.

A further aspect of the invention involves the use of a torsion spring instead of or in addition to the stack of clutch plates in the main clutched joint.

A still further aspect of the invention relates to the elimination of backlash during movement of the arms on each side of a clutch assembly.

Other features and advantages of the invention will appear from the following description in which the preferred embodiments have been set forth in detail in conjunction with the accompanying drawings.

BRIEF DESCRIPTION OF THE DRAWINGS

FIG. 6 is an end view of the first arm of the joint of FIG. 2 viewed along line 6—6;

FIGS. 7 and 8 are side views showing the joint of FIG. 1 suspending a monitor and supporting a lamp, respectively;

DESCRIPTION OF THE PREFERRED EMBODIMENTS

Figure 1A:
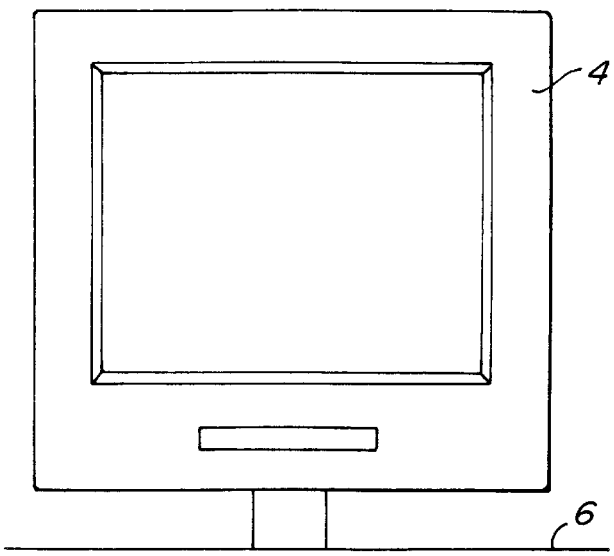
FIG. 1A is a front view of the monitor and conduit of FIG. 1.
Figure 1:
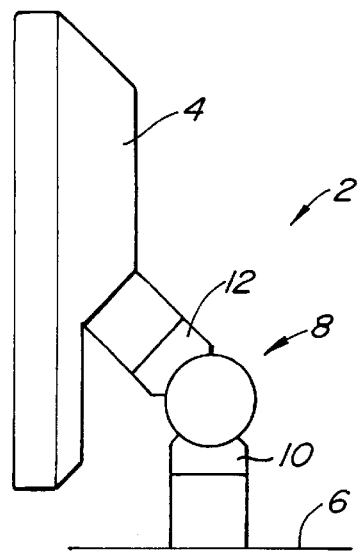
FIG. 1 is a simplified side view of an articulated conduit supporting a flat screen monitor above a support surface.
Figure 2:
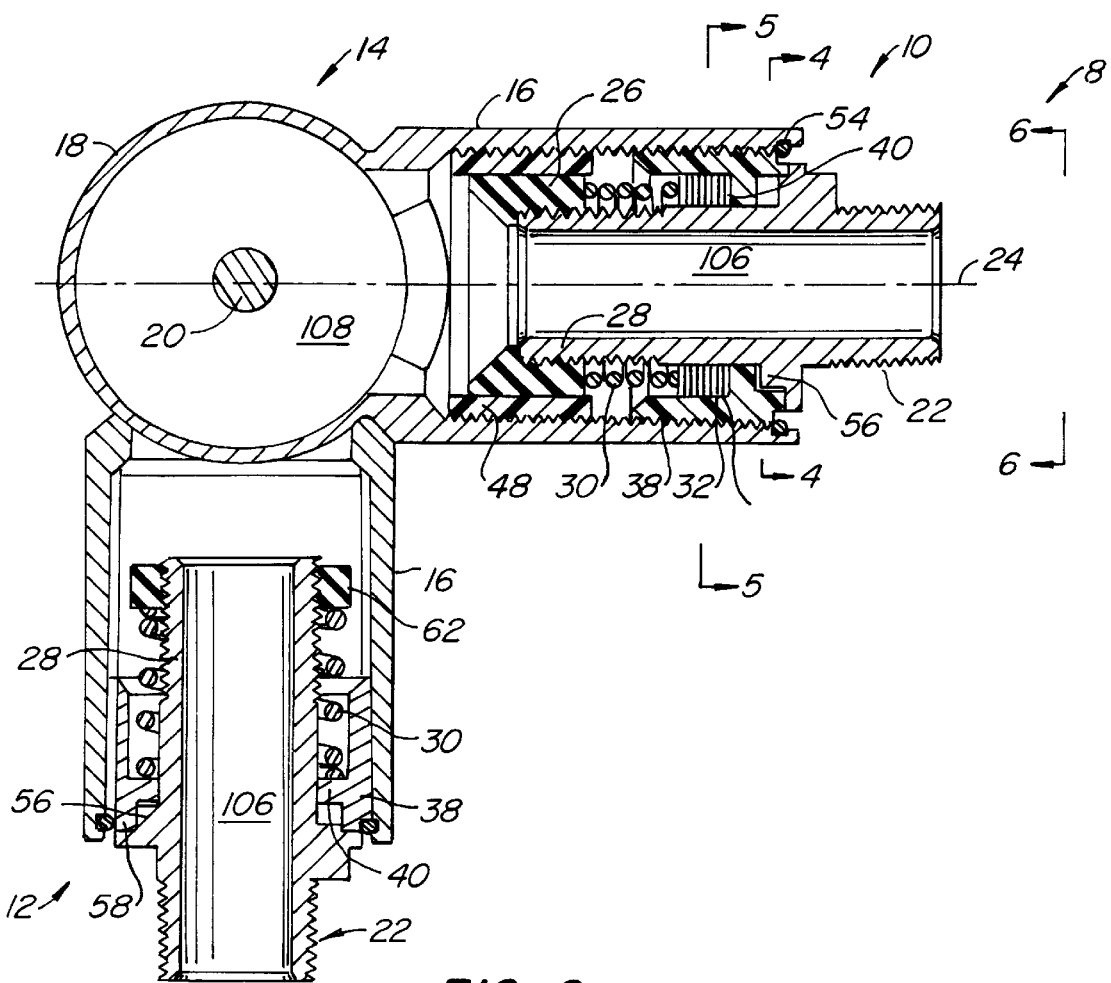
FIG. 2 is an enlarged cross-sectional view of the articulated conduit joint of FIG. 1.

FIG. 1 illustrates an articulated conduit 2 shown supporting a flat screen monitor 4 above a support surface 6. Articulated conduit 2 includes an articulated conduit joint 8 shown in more detail in FIGS. 2 and 3.

Joint 8 includes broadly a first arm 10 and a second arm 12 coupled by a main clutched joint 14. First arm 10 and second arm 12 both include an arm housing 16 from which a cylindrical extension 18 extends. The arm housing 16 and cylindrical extension 18 for first and second arms 10, 12 and the main clutched joint 14 are identical members to help reduce the cost of construction. First and second arms 10, 12 are mounted to one another for pivotal movement relative to one another about a first axis 20 of joint 14.

First arm 10 includes a threaded extension 22 mounted within arm housing 16 for rotational movement about a second axis 24. A threaded end cap 26 is mounted to the partially threaded inner end 28 of extension 22 to bias a coil compression spring 30 against a stack of clutch plates 32, 34. Inner end 28 has a pair of parallel flats 36, see FIG. 5, formed on either side. Clutch plates 32 are keyed to inner end 28. The outer circumference of clutch plates 32 are circular so that clutch plates 32 are driven by and rotate with threaded extension 22 but rotate freely within a clutch insert 38.

Figure 5:
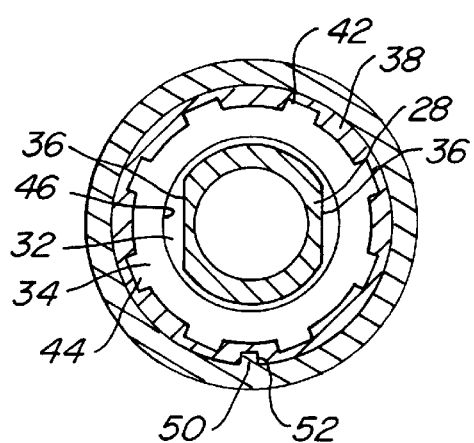

Clutch insert 38 is fixed within the interior of arm housing 16 and has a shoulder 40 against which spring 30 presses the stack of clutch plates 32, 34. Clutch insert 38 has eight equally-spaced recesses 42, see FIG. 5, formed therein to accommodate similar extensions or ears 44 of clutch plates 34. As seen in FIG. 5, the inner circumferences 46 of clutch plates 34 are circular so that clutch plates 34 rotate freely about inner end 28 of extension 22. Accordingly, clutch plates 32, 34, which are alternatingly positioned along inner end 28, are keyed to inner end 28 and clutch insert 38 respectively.

Pressing spring 30 against the stack of clutch plates 32, 34 by threaded end cap 26 provides an adjustable frictional resistance to the rotation of threaded extension 22 about second axis 24. The amount of the frictional resistance can be adjusted by the strength of spring 30, the number and frictional characteristics of clutch plates 32, 34 and how tightly threaded end cap 26 is tightened against spring 30. It is preferred that the clutch plate contacting spring 30 be a clutch plate 32 keyed to inner end 28 so that rotational movement of threaded extension 22 about axis 24 does not tend to cause spring 30 to rotate about threaded extension 22 thus helping to prevent the undesirable backing off of threaded end cap 26. A low-friction plastic sleeve or bushing 48 is positioned between housing 16 and threaded end cap 26 to provide radial stability for inner end 28 of threaded extension 22.

Figure 4:
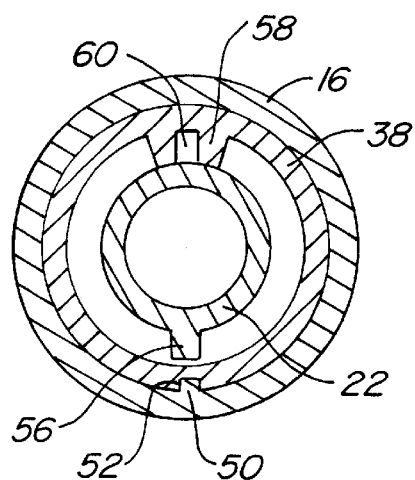
FIGS. 4 and 5 are cross-sectional views taken along lines 4—4 and 5—5 of FIG. 2.

FIGS. 4–6 illustrate an inner extension 50 from arm housing 16 which engages a similarly sized and positioned groove 52 formed in clutch insert 38 to prevent the rotation of clutch insert within arm housing 16. Clutch insert 38 is maintained within arm housing 16 by the use of a snap ring 54. (See FIG. 2.)

In the preferred embodiment the rotary movement of threaded extension 22 within arm housing 16 is restricted to about 340°. This is achieved by the provision of a radially-extending tab 56, see FIGS. 2 and 4, extending from threaded extension 22. Tab 56 contacts a slotted extension 58 extending inwardly from clutch insert 38 at either end of its rotary movement. In some cases, it may be desirable to prevent threaded extension 22 from rotating about second axis 24 within arm housing 16. To do so, tab 56 is positioned within slot 60 formed within slotted extension 58. Such positioning typically occurs during assembly. In the disclosed embodiment extension 22 is limited to about 340° of rotary motion about second axis 24. If desired, this range of motion could be changed by changing the circumferential size of extension 58 or by using more than one extension.

Second arm 12 is similar to first arm 10 but does not include a clutched joint. Rather, tab 56 of threaded extension 22 is positioned within slot 60 of slotted extension 58 to prevent the rotary movement of threaded extension 22 within arm housing 16. In this case, a simple threaded nut 62 is mounted to inner end 28 to capture a spring 30 between nut 62 and the shoulder 40 of insert 38. Spring 30 maintains tab 56 within slot 60. In the embodiment shown in FIG. 2, spring 30 is sufficiently undeflected so that if desired the user could pull threaded extension 22 outwardly to disengage tab 56 from within slot 60 to permit relative rotary movement between extension 22 and arm housing 16 or to reposition tab 56 into a slot 60 of a different slotted extension 58 (not shown).

Figure 3:
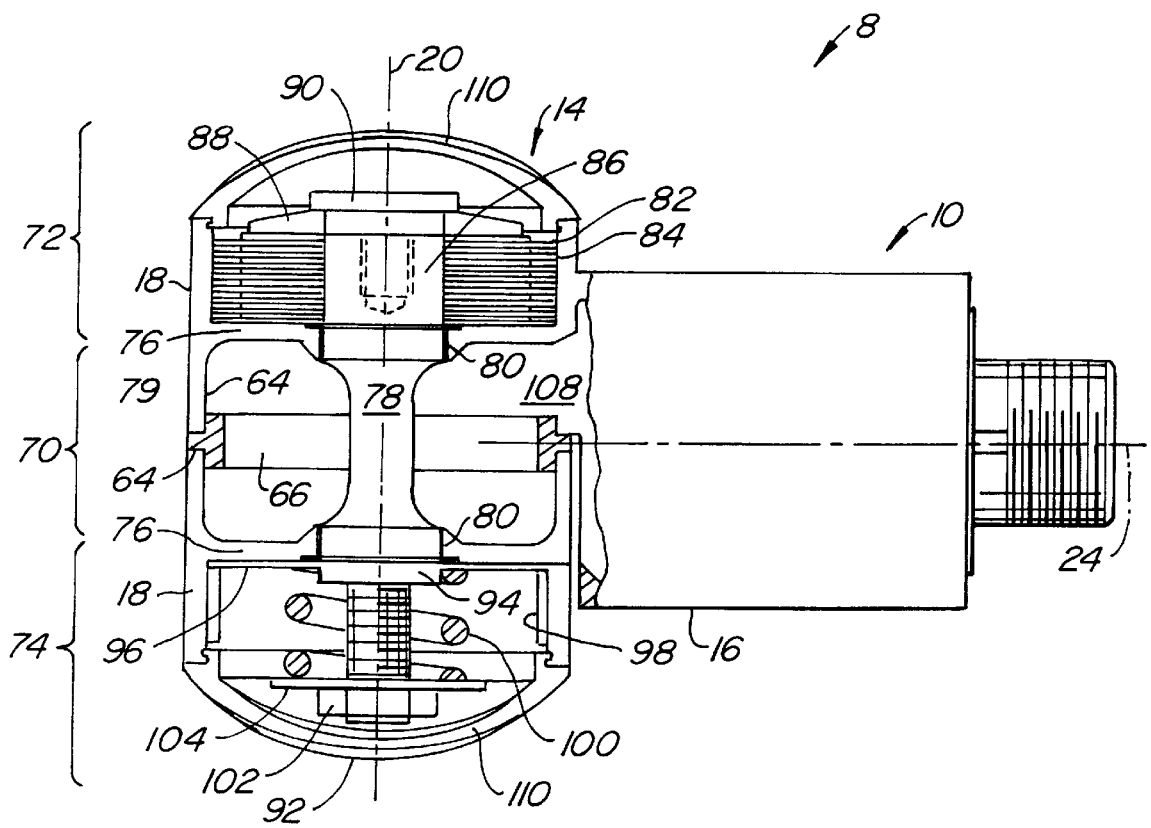
FIG. 3 is a partial cross-sectional view of the joint of FIG. 2 illustrating the main clutched joint.

FIG. 3 illustrates main clutched joint 14 in which cylindrical extensions 18 extending from arm housing 16 of first and second arms 10, 12 have opposed annular edges 64 separated by a separator ring 66. Ring 66 has a T-cross-sectional shape and is made of an appropriate material such as acetal. The T-cross-sectional shape of ring 66 helps to stabilize inner edges 64 and keep them aligned during use.

Clutched joint 14 includes a central portion 70 and first and second end portions 72, 74. Each cylindrical extension 18 includes an annular barrier or ledge 76 at one end of end portions 72, 74. A pivot pin 78 is mounted along first axis 20 and passes through bearing sleeves 79 mounted within openings 80 formed in annular barriers 76. Sleeves 79 allow pivot pin 78 to rotate freely within sleeves 79 and help ring 66 stabilize and align inner edges 64 of first and second arms 10, 12. A stack of clutch plates 82, 84 are mounted over pivot pin 78 and are keyed to pivot pin 78 and cylindrical extension 18, respectively. That is, clutch plates 82, 84, which alternate along pivot pin 78, are configured so that clutch plates 82 are keyed to pivot pin 78 but freely rotate within cylindrical extension 18 while clutch plates 84 freely rotate about pivot pin 78 but are keyed to cylindrical extension 18. The keying of clutch plates 84 to cylindrical extension 18 is in a manner similar to how clutch plates 34 are keyed to clutch insert 38 as shown in FIG. 5. In the preferred embodiment clutch plates 82 have rectangular openings which mount over the complementarily-shaped end 86 of pivot pin 78. A clutch plate washer 88 is mounted over the stack of clutch plates 82, 84 by clutch plate screw 90 which is threaded into the end 86 of pivot pin 78.

Pivot pin 78 includes a threaded end 92 having a square shoulder 94 and over which a clutch plate 96, also having a complementary square opening, is mounted. Clutch plate 96 has a scalloped outer edge, much like clutch plates 34, to engage similarly shaped interior surface 98 of cylindrical extension 18. A spring 100 biases clutch plate 96 against annular barrier 76 and biases a nut and washer 102, 104 mounted to threaded end 92 of pivot pin 78 away from barrier 76. Pivotal movement of arms 10, 12 about axis 20 causes pivot pin 78 to move with second arm 12, causes clutch plates 82, which are fixed to pivot pin 78, to move with second arm 12, and causes clutch plates 84 to move with first arm 10 thus creating a friction force between clutch plates 82, 84. The amount of friction can be changed by changing the number and frictional characteristics of clutch plates 82, 84, the strength of spring 100, and how tightly nut 102 is tightened against spring 100. Since spring 100 rotates with pivot pin 78, there is no tendency for nut 102 to back off of threaded end 92 during use.

Arms 10, 12 define passages 106 along their lengths which open into an open interior 108 designed within central portion 70 of main clutched joint 14. As suggested in FIGS. 2 and 3, passage 106 of arm 10 opens into interior 108 above second axis 24 while passage 106 of arm 12 opens into interior 108 below second axis 24. Separating clutch plates 82, 84 from spring 100 and leaving open interior 108 substantially open, allows free movement of wires and cables along passage 106 of arm 10, through open interior 108 and through passage 106 of arm 12.

First and second end portions 72, 74 are terminated by plastic end caps 110 which snap onto cylindrical extensions 18 to create a neat appearance while limiting access to the interior workings of clutched joint 14. If it is desired to change the frictional resistance of clutched joint 14, the user can simply pry off end cap 110 to expose nut 102 and either tighten or loosen nut 102 to change the force of spring 100.

In use, threaded end cap 26 is adjusted to create the desired force to be exerted by spring 30, typically when joint 8 is assembled. Nut 62 is typically tightened sufficiently to create an appropriate amount of force to ensure that tab 56 is not inadvertently removed from slot 60. Nut 102 is adjusted according to the force to be exerted on joint 8 by monitor 6. While the tightness of nut 102 may be initially set on assembly, the tightness of nut 102 can be easily adjusted by the user, first removing end cap 110 and tightening or loosening nut 102. The user can position monitor 4 at the desired orientation when the frictional forces exerted by joint 8 are sufficient to maintain monitor 4 in the desired orientation. In FIG. 1, axis 24 is oriented vertically to permit monitor 4 to be pivoted about that vertical axis through rotation of arm housing 16 about threaded extension 22 of first arm 10.

The invention can be used in other applications as well. FIG. 7 illustrates an articulated conduit 2 depending from an overhead shelf 112 suspending a monitor 4 in space. FIG. 8 illustrates an articulated conduit 2a incorporating two joints 8 to support a lamp 114.

Figures 9, 10, 11:
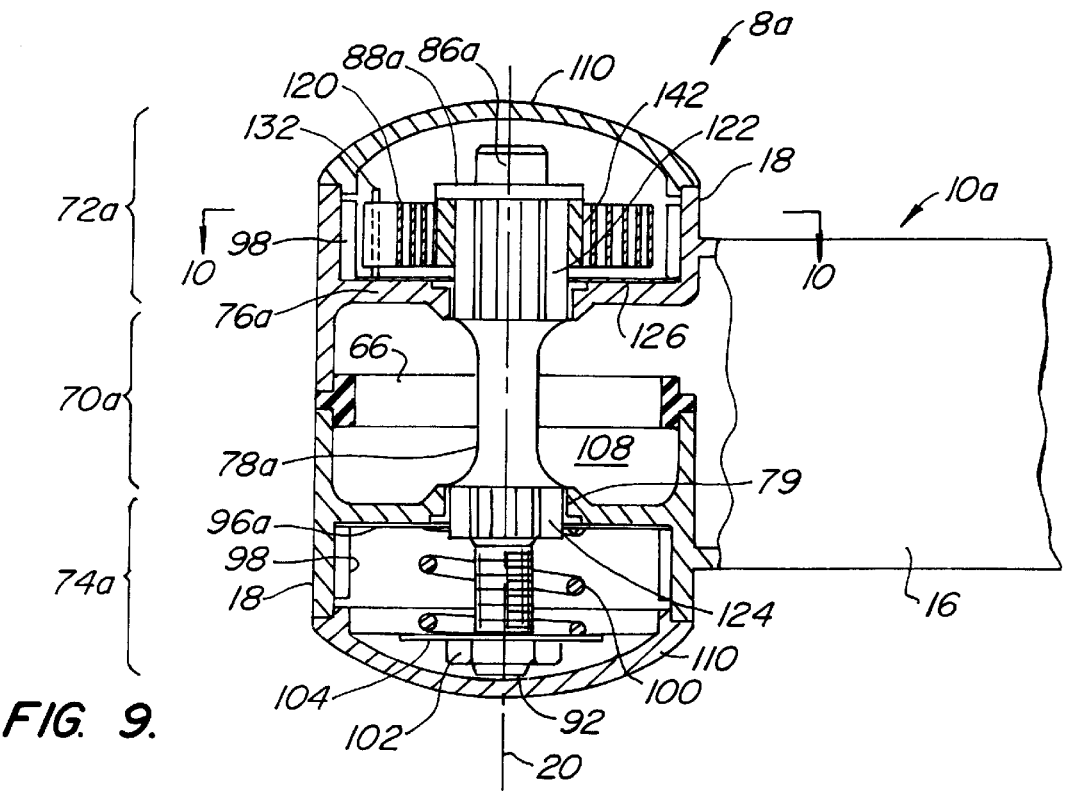
FIG. 9 is a view similar to that of FIG. 3 showing an alternative embodiment of the main clutched joint.
FIG. 10 is a cross-sectional view taken along 10—10 of FIG. 9.
FIG. 11 is an isometric view of the torsion spring anchor plate of FIGS. 9 and 10.

FIGS. 9 and 10 illustrate a joint 8a similar to joint 8, with similar features identified by similar reference numbers, but where clutch plates 82, 84 have been replaced by a coil torsion spring 120. Also, pivot pin 78a has been modified to have splined regions 122, 124 instead of, for example, flats 36 or square shoulders 94 as in the embodiment of FIGS. 2 and 3. A spring anchor plate 126, shown in FIG. 11, has a central bore 128 sized to fit over and freely rotate about splined region 122. The outer circumference 130 of plate 126 is splined and configured to correspond to and mate with the similarly shaped surface 98 of cylindrical extension 18. One section 132 of anchor plate 126 is bent to extend normally to the remainder of the anchor plate. Section 132 has a tab or ear 134 extending from its outer end. The hooked outer end 136 of spring 120 is sized to fit within the region or gap 138 defined by ear 134 so that the hooked outer end remains totally engaged with section 132 of spring anchor plate 126. The angled inner end 140, see FIG. 10, of coil torsion spring 120 is positioned within a suitably sized and positioned opening formed in splined region 122 of pivot pin 78a. Inner end 140 also passes through an appropriately positioned gap formed in a spacer sleeve 142 which fits over splined region 122 and rests against spring anchor plate 126 adjacent to central bore 128. A washer 88a is mounted to the end 86a of pivot pin 78a using an interference fit. Washer 88a maintains spacer sleeve 142 in place and also retains inner end 140 of torsion spring 120 housed within the slot formed in splined region 122.

With the embodiment of FIGS. 9–11 inner end 140 of torsion spring 120 rotatably drives pivot pin 78. Pivot pin 78 passes freely through central extension 18 of the first end portion 72a of joint 8a. However, pivot pin 78a is keyed to a plate 96a, plate 96a having splined inner and outer edges which engage splined region 124 and splined surface 98, respectively. Thus, rotation of pivot pin 78 causes like rotation of second end portion 74a and the second arm (not shown) therewith. Similarly, first end portion 72a and first arm 10a therewith, due to the engagement of outer end 136 of torsion spring 120 with section 132 of anchor plate 126, rotate about first axis 20 relative to second end portion 74a and the second arm. If desired, clutch plates 82, 84 could be used between anchor plate 126 and your barrier 76a of end portion 72a to provide frictional resistance to the relative pivotal movement of the first and second arms.

Figure 13:
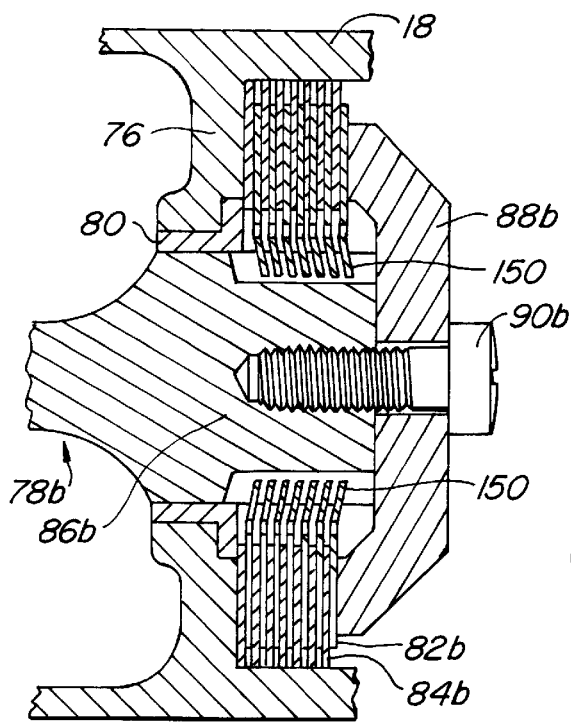
FIG. 13 illustrates the stack of clutch plates and splined end of FIG. 12 mounted within a cylindrical extension.
Figure 12:
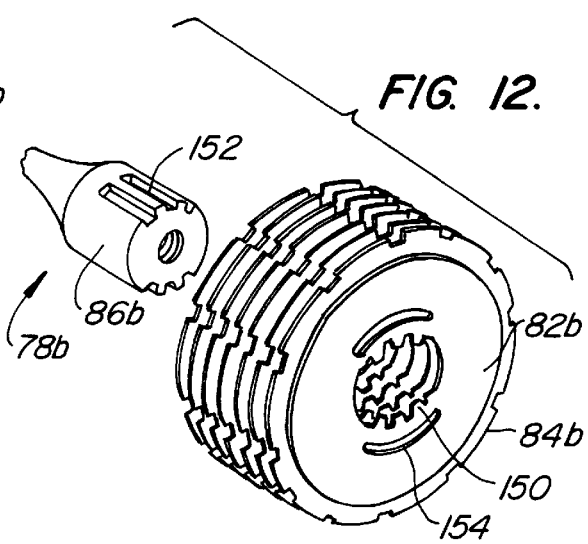
FIG. 12 illustrates a stack of clutch plates and the splined end of a pivot pin of an alternative embodiment of the invention.

FIG. 12 illustrates a stack of clutch plates 82b, 84b arranged adjacent the splined end 86b of a pivot pin 78b. First clutch plates 84b are similar to clutch plates 84. Second clutch plates 82b are keyed to splined end 86b through the use of radially inwardly converging spline teeth 150 which engage radially outwardly diverging spline openings 152 formed on splined end 86b. Spline teeth 150 and spline openings 152 are sized to create a very slight interference fit. Because of this, mounting splined end 86b onto the stack of clutch plates 82b, 84b causes spline teeth 150 to pivot about their bases and deflect axially and radially as illustrated in FIG. 13. That is, the sidewalls defining spline teeth 150 and spline openings 152 move radially outwardly (as well as axially) relative to one another so that a proper, non-interfering fit is achieved between the two. This small amount of outward radial movement of spline teeth 150 is permitted or accommodated by crescent shaped openings 154 formed in second clutch plates 82b. Thus, as shown in FIG. 13, spline teeth 150 are biased against and resiliently engage splined end 86b to maintain a good, full engagement between the complementary tapering surfaces. This configuration effectively eliminates backlash between squared end 86b and second clutch plates 82b, and thus between first and second arms 10, 12, of the embodiment of FIGS. 2 and 3. An advantage of this interfering spline engagement arrangement is that spline sizes are not critical. That is, clutch plates 82b can be stamped out from sheet stock and pivot pin 78b could be, for example, die cast; expensive machining of spline openings 152 and spline teeth 150 should not be necessary.

Figure 14:
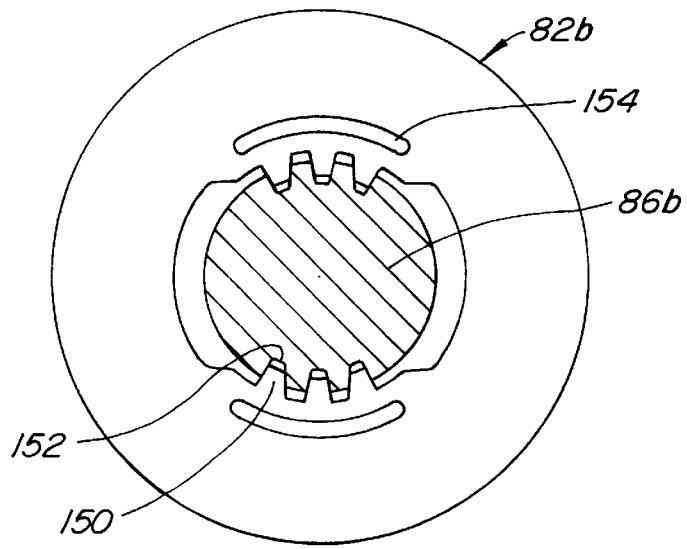
FIG. 14 is a simplified cross-sectional view illustrating the engagement of the splined teeth of the second clutch plates with the splined openings of the pivot pin of FIG. 12.
Figure 15:
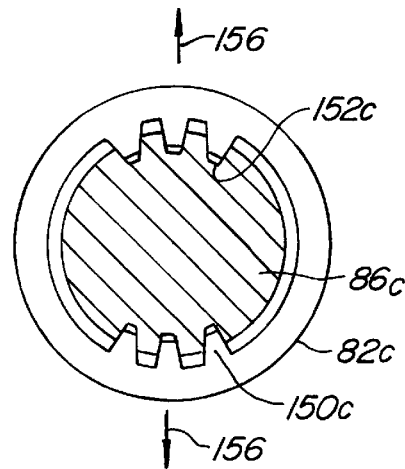
FIG. 15 illustrates an alternative embodiment of the second clutch plate of FIG. 14 in which radial deflection of the splined teeth is accommodated by the radial elongation of the clutch plate.
Figure 16:
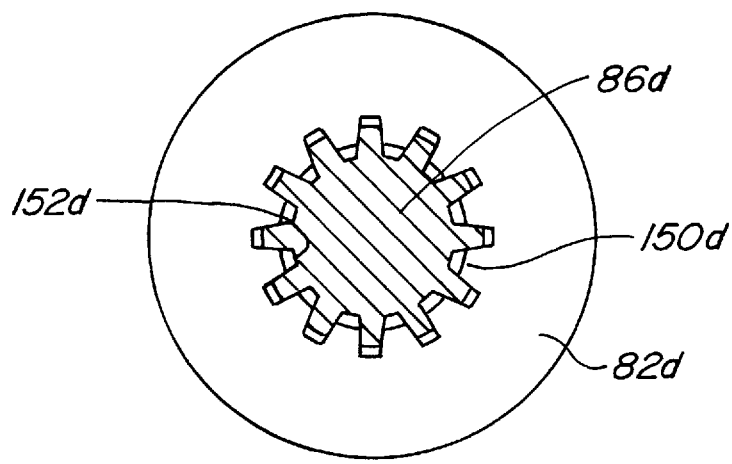
FIGS. 16 and 17 are simplified cross-sectional views of a further alternative embodiment of the second clutch plates of FIGS. 12–15.
Figure 17:
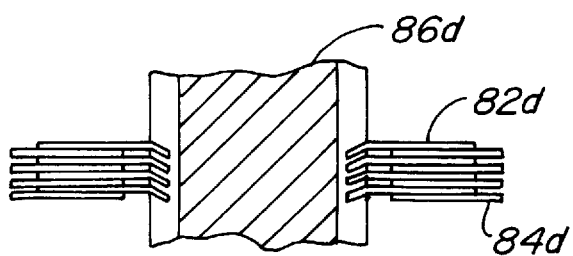

The embodiment of FIGS. 12–14 achieves radial deflection of spline teeth 150, which permits the proper engagement of the sidewalls defined by the spline teeth and spline openings, by the pivotal movement of the spline teeth. FIG. 15 illustrates an alternative method for permitting the entire spline teeth 150 to deflect radially so to properly engage spline openings 152c. This is achieved by making the body of clutch plate 82c relatively thin and the outside diameter relatively small. This permits clutch plate 82c to deform to be slightly oblong shaped in the direction of arrows 156 while resiliently biasing spline teeth 152c into splined openings 152c. Spline teeth 150c can also pivot as well as move radially. FIGS. 16 and 17 illustrate a further variation of the embodiments of FIGS. 12–15 in which 360° of spline teeth 150d are used. For the embodiment of FIGS. 16 and 17 to work, clutch plate 82d will typically be made relatively thin to permit the desired flexing of spline teeth 150d. Also, it may be desirable to provide a preset bend in any or all of the spline teeth of FIGS. 12–17.

Modification and variation can be made to the disclosed embodiments without departing from the subject of the invention as defined in the following claims. In some situations it may be desirable to use joint 8 but not provide for a clutch joint in either of first or second arms 10, 12. If it is desired to prevent the disengagement of tab 56 from slot 60, spring 30 could be compressed completely by nut 62 or spring 30 could be eliminated and nut 62 modified so that the modified nut contacts shoulder 40 prior to mounting the combination of threaded extension 22 and clutch insert 38 into the interior of arm housing 16. The keyed relationship between clutch plates 32 and inner end 28 of threaded extension 22 could be through configurations other than parallel flats 36, such as a D-shaped keyed interface, a hexagonal interface or other suitable configurations. Similarly, the keyed interface between clutch plates 34 and clutch insert 38 could be other than through the use of recesses 42 and extensions 44. The same holds true for clutch plates 82, 84. In the disclosed embodiment of FIGS. 1–6, pin 78 is placed into tension by spring 100 to press clutch plates 82, 84 against one another; clutched joint 14 could be configured so that pin 78 is placed into compression to press clutch plates 82, 84 against one another.

What is claimed is:

1. A joint for an articulated conduit comprising:
   a first arm having a first passage;
   a second arm having a second passage; and
   a main clutched joint pivotally coupling the first and second arms for pivotal movement about a first axis, the main clutched joint comprising:
   a generally open central portion located between first and second end portions, said portions aligned with said first axis, said first and second arms extending from the first and second end portions, said central portion opening into said first and second passages to permit a flexible element to pass along said first passage, said central portion and said second passage;
   a joint pin passing from said first end portion, through said central portion and to said second end portion;
   first and second clutch plates housed within the first end portion and keyed to said first end portion and said joint pin respectively;
   a biasing element within said second end portion; and
   a clutch plate coupler biased against the clutch plates by the biasing element so that moving the first and second arms and the first and second end portions therewith about said first axis is frictionally resisted by sliding friction between said first and second clutch plates.

2. The joint according to claim 1 wherein a chosen one of said first and second arms comprise an arm body and an arm extension housed within said arm body for movement about a second axis passing along said passage of said chosen arm, said passage being at least partly defined within said arm extension.

3. The joint according to claim 2 wherein said chosen arm comprises alternating first and second chosen arm clutch plates keyed to the arm extension and the arm body, respectively, and a biasing device biasing said chosen arm clutch plates against one another to provide frictional resistance to movement of said arm extension within said arm body and about said second axis.

4. The joint according to claim 2 wherein said chosen arm comprises a rotary stop preventing unrestricted rotary movement of said arm extension within said arm body.

5. The joint according to claim 4 wherein said rotary stop comprises a slotted extension extending radially inwardly from said arm body and a boss extending radially outwardly from said arm extension, said boss sized to fit within said slotted extension to prevent relative rotary motion between said arm body and said arm extension.

6. The joint according to claim 1 wherein said clutch plate coupler comprises a clutch plate washer mounted to the joint pin and wherein said biasing element places the joint pin in tension.

7. The joint according to claim 1 wherein said central portion of the main clutched joint is created by first and second cylindrical extensions of the first and second end portions.

8. The joint according to claim 7 wherein said first and second cylindrical extensions have opposed annular edges separated by a separator ring.

9. The joint according to claim 8 wherein said separator ring comprises axially-extending portions shaped to help maintain said opposed annular edges positioned opposite one another.

10. The joint according to claim 9 wherein said separator ring has a T-cross-sectional shape.

11. The joint according to claim 1, wherein the second clutch plates are keyed to the joint pin by means for eliminating backlash between said first and second arms.

12. The joint according to claim 1, wherein the joint pin has spline openings and the second clutch plates have spline teeth engaging said spline openings.

13. The joint according to claim 12, wherein the spline openings are defined by radially outwardly diverging spline opening walls and the spline teeth have radially inwardly converging spline teeth walls.

14. The joint according to claim 13, wherein the spline opening walls and the spline teeth walls are sized to create an interference fit.

15. The joint according to claim 13, wherein the spline teeth walls resiliently engage the spline opening walls.

16. The joint according to claim 13, wherein the spline teeth walls are flat.

17. The joint according to claim 13, wherein the second clutch plates comprise means for resiliently biasing the spline teeth walls against the spline opening walls.

18. The joint according to claim 17, wherein said resiliently biasing means comprises means for lessening the axial stiffness of said spline teeth.

19. The joint according to claim 17, wherein the resiliently biasing means comprises means for accommodating deflection of said spline teeth generally along said first axis.

20. The joint according to claim 17, wherein the resiliently biasing means comprises means for accommodating radial movement of said spline teeth.

21. A joint for an articulated conduit comprising:

a first arm having a first passage;

a second arm having a second passage;

a main clutched joint pivotally coupling the first and second arms for pivotal movement about a first axis, the main clutched joint comprising:

- a generally open central portion located between first and second end portions, said portions aligned with said first axis, said first and second arms extending from the first and second end portions, said central portion opening into said first and second passages to permit a flexible element to pass along said first passage, said central portion and said second passage;
- a joint pin passing from said first end portion, through said central portion and to said second end portion;
- first and second clutch plates housed within the first end portion and keyed to said first end portion and said joint pin respectively;
- a biasing element within said second end portion; and
- a clutch plate coupler biased against the clutch plates by the biasing element so that moving the first and second arms and the first and second end portions therewith about said first axis is frictionally resisted by sliding friction between said first and second clutch plates; and a chosen one of said first and second arms comprising:

- an arm body and an arm extension housed within said arm body for movement about a second axis passing along said passage of said chosen arm, said passage being at least partly defined within said arm extension;
- alternating first and second chosen arm clutch plates keyed to the arm extension and the arm body, respectively;
- a biasing device biasing said chosen arm clutch plates against one another to provide frictional resistance to movement of said arm extension within said arm body and about said second axis; and
- a rotary stop preventing unrestricted rotary movement of said arm extension within said arm body.

22. The joint according to claim 21 wherein said rotary stop comprises a slotted extension extending radially inwardly from said arm body and a boss extending radially outwardly from said arm extension, said boss sized to fit within said slotted extension to prevent relative rotary motion between said arm body and said arm extension.

* * * * *